(12) United States Patent
Miyanaga et al.

(10) Patent No.: US 8,350,408 B2
(45) Date of Patent: Jan. 8, 2013

(54) POWER MANAGEMENT CIRCUIT

(75) Inventors: Koichi Miyanaga, Kyoto (JP); Yutaka Shibata, Kyoto (JP); Akihito Ito, Kyoto (JP)

(73) Assignee: Rohm Co., Ltd. (JP)

( * ) Notice: Subject to any disclaimer, the term of this patent is extended or adjusted under 35 U.S.C. 154(b) by 249 days.

(21) Appl. No.: 12/745,980

(22) PCT Filed: Dec. 3, 2008

(86) PCT No.: PCT/JP2008/003578
§ 371 (c)(1),
(2), (4) Date: Jun. 3, 2010

(87) PCT Pub. No.: WO2009/072281
PCT Pub. Date: Jun. 11, 2009

(65) Prior Publication Data
US 2010/0270862 A1    Oct. 28, 2010

(30) Foreign Application Priority Data
Dec. 3, 2007    (JP) .................................. 2007-312860

(51) Int. Cl.
*H02J 1/10* (2006.01)
(52) U.S. Cl. ............................................ 307/43; 307/66
(58) Field of Classification Search .................... 307/43, 307/66; 320/107
See application file for complete search history.

(56) References Cited

U.S. PATENT DOCUMENTS

| | | | |
|---|---|---|---|
| 7,528,582 B1 * | 5/2009 | Ferguson ..................... | 320/164 |
| 7,764,050 B2 * | 7/2010 | Xing et al. ................... | 320/164 |
| 2007/0262651 A1 | 11/2007 | Odaohara | |

FOREIGN PATENT DOCUMENTS

| | | |
|---|---|---|
| CN | 1722032 A | 1/2006 |
| CN | 101071955 A | 11/2007 |
| GB | 2159286 A | 11/1985 |
| JP | 61-8677 A | 1/1986 |
| JP | 3-49418 A | 3/1991 |
| JP | 3-190539 A | 8/1991 |
| JP | 8-182221 A | 7/1996 |
| JP | 9-219935 A | 8/1997 |
| JP | 2005-188936 A | 7/2005 |
| JP | 2007-306647 A | 11/2007 |

OTHER PUBLICATIONS

International Preliminary Report on Patentability for International Application No. PCT/JP2008/003578 mailed Jun. 17, 2010 with English translation.
International Search Report for International Application No. PCT/JP2008/003578 mailed Feb. 10, 2009 with English translation.
The First Office Action for Chinese Application No. 200880119097.0, issued Sep. 29, 2012, with English translation.

* cited by examiner

*Primary Examiner* — Carlos Amaya
(74) *Attorney, Agent, or Firm* — Cantor Colburn LLP

(57) ABSTRACT

An external power source is connected to an adapter input terminal (first terminal). A battery is connected to a path input terminal (second terminal). A selection circuit (a first switch, a second switch, logic circuit compares the input voltage input from the external power supply with the battery voltage, and selects one of the two. The voltage thus selected by the selection circuit is output to an external load circuit via a system power supply terminal. A charging circuit charges the battery using the input voltage supplied from the external power supply.

9 Claims, 11 Drawing Sheets

TERMINAL SETTING WHEN TEMPERATURE DETECTION IS DISABLED

TERMINAL SETTING WHEN TEMPERATURE DETECTION IS ENABLED

FIG.6

| INPUT | | SETTINGS | | | NOTE |
|---|---|---|---|---|---|
| SET0 | SET1 | CHARGING OPERATION | | INPUT CURRENT LIMIT | |
| | | ON/OFF | SUSPEND SIGNAL | | |
| 0 | 0 | OFF | 1 | — | SUSPEND MODE |
| 0 | 1 | ON | 0 | 100mA | 1/5 MODE |
| 1 | 1 | ON | 0 | 500mA | NORMAL MODE |
| 1 | 0 | ON | 0 | 1000mA | DOUBLE MODE |

| CHARGING STATE | STAT0 | STAT1 | STAT2 |
|---|---|---|---|
| PRE_CHG | L | L | L |
| TURBO_CHG | L | L | H |
| Iterm_detect | L | H | L |
| CHG_complete | H | H | L |
| SUSPEND | H | H | H |
| Batt_error_Stop | H | L | H |
| TEMP_Stop | H | L | L |

FIG.9

| No. | BALL | TERMINAL NAME | D/A | I/O | INITIAL VALUE | FUNCTION |
|---|---|---|---|---|---|---|
| 1 | E5 | PVIN | A | — | — | USB PORT OR AC ADAPTER INPUT TERMINAL |
| 2 | F5 | PVIN | A | — | — | USB PORT OR AC ADAPTER INPUT TERMINAL |
| 3 | F4 | PVIN | A | — | — | USB PORT OR AC ADAPTER INPUT TERMINAL |
| 4 | E1 | VINSNS | A | — | — | USB PORT OR AC ADAPTER INPUT TERMINAL |
| 5 | E4 | CI | A | I | — | INPUT CURRENT DETECTION UNIT CONNECTION TERMINAL |
| 6 | E3 | SYS | A | O | — | SYSTEM POWER SUPPLY TERMINAL |
| 7 | F3 | SYS | A | O | — | SYSTEM POWER SUPPLY TERMINAL |
| 8 | C6 | SW | A | O | — | SW DRIVER OUTPUT TERMINAL |
| 9 | E2 | GATE | D | O | — | EXTERNAL PMOS GATE CONTROL OUTPUT TERMINAL |
| 10 | C5 | SW | A | O | — | SW DRIVER OUTPUT TERMINAL |
| 11 | D6 | SW | A | O | — | SW DRIVER OUTPUT TERMINAL |
| 12 | A3 | IS1 | A | I | — | PLUS TERMINAL OF CHARGING CURRENT SENSING INPUT |
| 13 | A2 | IS2 | A | I | — | MINUS TERMINAL OF CHARGING CURRENT SENSING INPUT |
| 14 | F2 | BAT1 | A | I/O | — | PATH INPUT TERMINAL FROM BAT TO SYSTEM |
| 15 | B2 | BAT2 | A | I | — | BAT VOLTAGE DETECTION INPUT TERMINAL |
| 16 | D1 | REF | A | O | — | REFERENCE VOLTAGE TERMINAL |
| 17 | D3 | TS | A | I | — | TEMPERATURE DETECTION INPUT / BATTERY CONNECTION DETECTION INPUT TERMINAL |
| 18 | E6 | SET0 | D | I | — | MODE SELECTION INPUT TERMINAL |
| 19 | D5 | SET1 | D | I | — | MODE SELECTION INPUT TERMINAL |
| 20 | D4 | TSEN | D | I | — | TEMPERATURE DETECTION ENABLE CONTROL INPUT TERMINAL |
| 21 | B3 | ISET1 | A | O | — | TERMINATION CHARGING CURRENT SETTING TERMINAL |
| 22 | B4 | ISET2 | A | O | — | TURBO CHARGING CURRENT SETTING TERMINAL |
| 23 | B1 | STAT0 | D | O | — | CHARGING STATE OUTPUT TERMINAL 0 |
| 24 | C2 | STAT1 | D | O | — | CHARGING STATE OUTPUT TERMINAL 1 |
| 25 | D2 | STAT2 | D | O | — | CHARGING STATE OUTPUT TERMINAL 2 |
| 26 | A5 | PGND | A | — | — | GROUND TERMINAL |
| 27 | B5 | PGND | A | — | — | GROUND TERMINAL |
| 28 | B6 | PGND | A | — | — | GROUND TERMINAL |
| 29 | A4 | GNDREF1 | A | — | — | GROUND TERMINAL |
| 30 | C1 | GNDREF2 | A | — | — | GROUND TERMINAL |
| 31 | A1 | TEST1 | D | — | L | TEST TERMINAL |
| 32 | A6 | TEST2 | D | — | L | TEST TERMINAL |
| 33 | F6 | TEST3 | D | — | L | TEST TERMINAL |
| 34 | F1 | TEST4 | D | — | L | TEST TERMINAL |
| 35 | C4 | N. C. | — | — | — | — |
| 36 | C3 | INDEX | — | — | — | — |

FIG.10

*Bottom View*

| | 1 | 2 | 3 | 4 | 5 | 6 |
|---|---|---|---|---|---|---|
| F | TEST4 | BAT1 | SYS | PVIN | PVIN | TEST3 |
| E | VINSNS | GATE | SYS | C1 | PVIN | SET0 |
| D | REF | STAT2 | TS | TSEN | SET1 | SW |
| C | GNDREF2 | STAT1 | INDEX | N.C | SW | SW |
| B | STAT0 | BAT2 | ISET1 | ISET2 | PGND | PGND |
| A | TEST1 | IS2 | IS1 | GNDREF1 | PGND | TEST2 |

FIG.11

| ITEM | SYMBOL | RATED (NOMINAL) VALUE | | | UNIT | CONDITION |
|---|---|---|---|---|---|---|
| | | Min | Typ | Max | | |
| SUSPEND-MODE CURRENT CONSUMPTION 1 | IQSUS1 | — | 200 | — | μA | SUSPEND MODE |
| TOTAL INPUT CURRENT 1 | IQVIN(LIM)1 | — | — | 100 | mA | X1/5 mode |
| TOTAL INPUT CURRENT 2 | IQVIN(LIM)2 | — | — | 500 | mA | X1 mode |
| TOTAL INPUT CURRENT 3 | IQVIN(LIM)3 | — | — | 1000 | mA | X2 mode |
| REF OUTPUT VOLTAGE | VREF | 3.35 | | 3.45 | V | |
| SWITCHING REGULATOR OSCILLATION FREQUENCY | fswosc | — | (2.2) | — | MHz | |
| TIMER CLOCK OSCILLATION FREQUENCY | fclkosc | (57.6) | | (70.4) | kHz | |
| CC-MODE CHARGING CURRENT 0 | ITURBO0 | — | 1000 | — | mA | RISET2=6kΩ, BAT=3.3V |
| CC-MODE CHARGING CURRENT 1 | ITURBO1 | — | 200 | — | mA | RISET2=30kΩ, BAT=3.3V |
| ISET2 SETTING VOLTAGE 1 | VISET2-1 | — | 1.0 | — | V | RISET2=30kΩ, BAT=3.3V |
| ISET2 SETTING VOLTAGE 2 | VISET2-2 | — | 0.1 | — | V | RISET2=30kΩ, BAT=2.5V |
| CHARGING TERMINATION CURRENT 0 | Iterm0 | — | 100 | — | mA | RISET1=12kΩ |
| CHARGING TERMINATION CURRENT 1 | Iterm1 | — | 20 | — | mA | RISET1=20kΩ |
| TURBO CHARGING START DETECTION VOLTAGE | VTURBO | 2.70 | | 3.00 | V | When BAT2 RISE |
| TURBO CHARGING START DETECTION HYSTERESIS WIDTH | ΔVTURBO | — | 100 | — | mV | |
| CHARGING RESTART JUDGMENT VOLTAGE | VRECHG | 3.90 | | 4.10 | V | When BAT2 FAIL |
| FULLY CHARGED STATE VOLTAGE | V0 | 4.17 | | 4.23 | V | I0=10mA |
| BATTERY OVERVOLTAGE DETECTION | VOVL0 | 4.30 | | 4.70 | V | When BAT2 RISE |
| VIN LOW-VOLTAGE ERROR CLEAR LEVEL | VINUVL01 | 4.2 | | 4.4 | V | When VIN RISE |
| VIN LOW-VOLTAGE DETECTION LEVEL | VINUVL02 | — | 4.0 | — | V | When VIN FAIL |
| VIN LOW-VOLTAGE ERROR CLEAR HYSTERESIS WIDTH | ΔVINUVL0 | 200 | | 400 | mV | |
| VIN OVERVOLTAGE DETECTION LEVEL | VINOVL0 | 6.0 | | 6.4 | V | When VIN RISE |
| BATTERY MOUNTED STATE DETECTION | VTS1 | REF-0.3 | REF-0.1 | — | V | REF=3.40V |
| TEMPERATURE (2°C) DETECTION | VTS2 | 2.352 | | 2.503 | V | REF=3.40V |
| TEMPERATURE (3°C) DETECTION | VTS3 | 2.321 | | 2.474 | V | REF=3.40V |
| TEMPERATURE (40°C) DETECTION | VTS40 | 1.182 | | 1.324 | V | REF=3.40V |
| TEMPERATURE (43°C) DETECTION | VTS43 | 1.104 | | 1.242 | V | REF=3.40V |
| TEMPERATURE (50°C) DETECTION | VTS50 | 0.937 | | 1.063 | V | REF=3.40V |
| SW1 ON RESISTANCE (PVIN⇔SYS) | RONSW1 | — | 1.0 | — | Ω | |
| SW2 ON RESISTANCE (BAT⇔SYS) | RONSW2 | — | 5.0 | — | Ω | |
| STATO 1, 2 TERMINAL OUTPUT "L" LEVEL | VOLSTAT | — | 0.2 | 0.5 | V | I0=5mA |
| STATO 1, 2 TERMINAL OFF TIME LEAKAGE CURRENT | ILKSTAT | — | 0 | 5 | μA | VSTAT=3.6V |

POWER MANAGEMENT CIRCUIT

CROSS REFERENCE TO RELATED APPLICATIONS

This is a U.S. national stage application of International Application No. PCT/JP2008/003578, filed on 3 Dec. 2008. Priority under 35 U.S.C. §119(a) and 35 U.S.C. §365(b) is claimed from Japanese Application No. JP2007-312860, filed 3 Dec. 2007, the disclosure of which is also incorporated herein by reference.

1. field of the Invention

The present invention relates to a power management circuit configured to manage the external voltage supplied from an adapter and the battery voltage.

2. Description of the Related Art

In recent years, various kinds of electronic devices such as PDAs (Personal Digital Assistants), laptop personal computers, etc., include a great number of electronic circuits mounted thereon. Examples of such electronic circuits include: a CPU (Central Processing Unit) and a DSP (Digital Signal Processor) each of which performs digital signal processing; a liquid crystal panel; and other analog circuits and digital circuits. In a battery-driven electronic device which includes a battery as a power supply, each electronic circuit included therein operates using the battery voltage supplied from the battery.

Electronic devices are known having a function of receiving electric power supplied from an external power supply such as an AC adapter, USB (Universal Serial Bus) port, or the like. Such an arrangement enables operation to be performed if the remaining battery charge becomes low, or even if a battery is not mounted on the electronic device. With such an arrangement, a power management circuit (power management IC) is provided, which performs a control operation for switching the voltage, which is to be used to operate the electronic device, between the voltage supplied from the external power supply and the voltage supplied from the battery. In a case in which the battery is a secondary battery such as a lithium-ion battery, the power management circuit has a function for charging the battery using the voltage supplied from the external power supply.

[patent document No. 1]
Japanese Patent Application Laid Open No. H09-219935
[patent document No. 2]
Japanese Patent Application Laid Open No. H03-49418
[patent document No. 3]
Japanese Patent Application Laid Open No. S61-8677

SUMMARY OF THE INVENTION

The present invention has been made in view of such a situation. Accordingly, it is a general purpose of the present invention to provide a power management circuit which is capable of providing integrated control of various power supplies.

An embodiment of the present invention relates to a power management circuit. The power management circuit comprises: a first terminal connected to an external power supply; a second terminal connected to a battery; a selection circuit configured to make a comparison between a voltage supplied from the external power supply via the first terminal and a battery voltage supplied from the battery via the second terminal, and to select one from among the voltage supplied from the external power supply and the battery voltage supplied from the battery; an output terminal configured to output the voltage thus selected by the selection circuit to an external load circuit; and a DC/DC converter charging circuit configured to charge the battery using the voltage supplied from the external power supply.

It should be noted that any combination of the aforementioned components may be made, and any component of the present invention or any manifestation thereof may be mutually substituted between a method, apparatus, and so forth, which are effective as an embodiment of the present invention.

It is to be noted that any arbitrary combination or rearrangement of the above-described structural components and so forth is effective as and encompassed by the present embodiments.

Moreover, this summary of the invention does not necessarily describe all necessary features so that the invention may also be a sub-combination of these described features.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIG. 6 is a diagram which shows the relation between the values input to the input terminals and the mode;

FIG. 8 is a diagram which shows the value of a state signal for each state;

FIG. 9 is a diagram which shows a list of the input/output terminals of the power management circuit;

FIG. 10 is a diagram which shows a layout of the electrodes of the power management circuit as viewed from the back face thereof; and FIG. 11 is a diagram which shows the rated operation conditions for the power supply circuit.

DETAILED DESCRIPTION OF THE INVENTION

Figure 1:
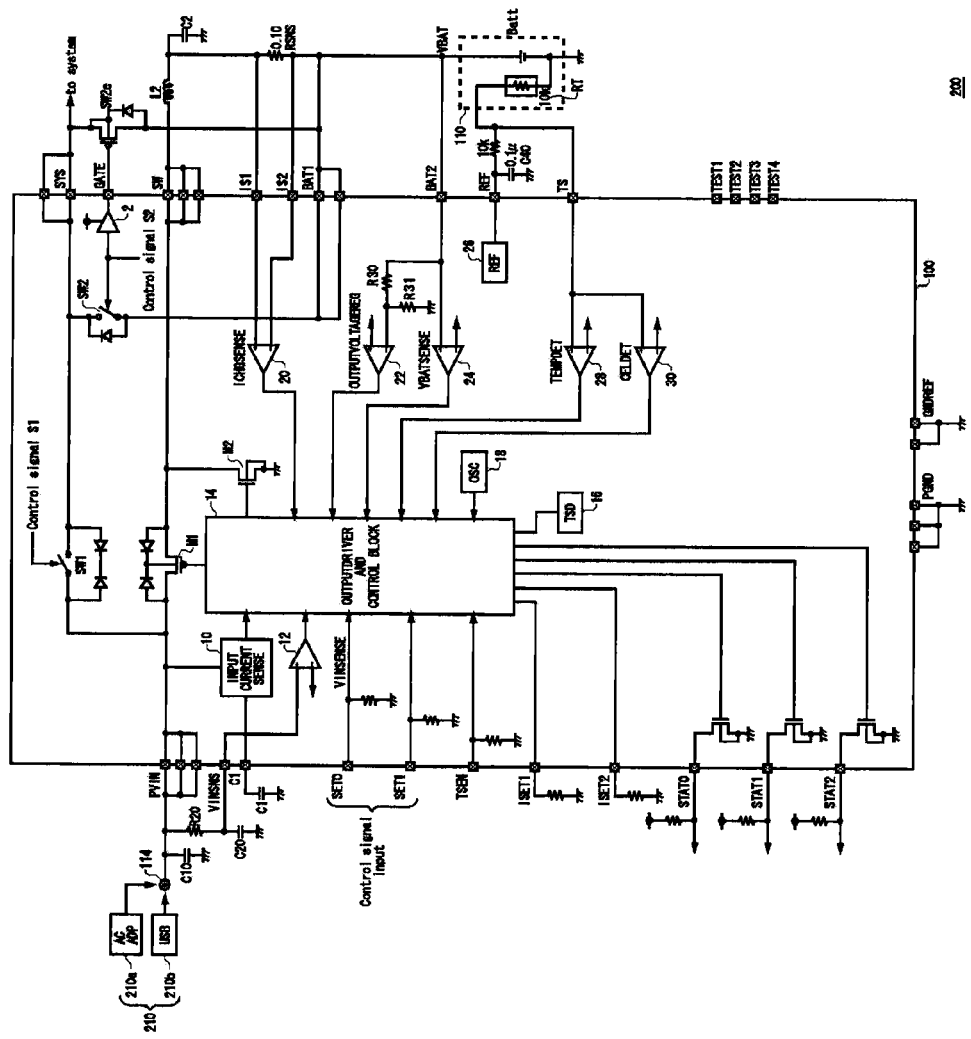
FIG. 1 is a circuit diagram which shows a configuration of an electronic device including a power management circuit according to an embodiment.

Description will be made below regarding the present invention based upon preferred embodiments with reference to the drawings. The same or similar components, members, and processes are denoted by the same reference numerals, and redundant description thereof will be omitted as appropriate. The embodiments have been described for exemplary purposes only, and are by no means intended to restrict the present invention. Also, it is not necessarily essential for the present invention that all the features or a combination thereof be provided as described in the embodiments.

In the present specification, the state represented by the phrase "the member A is connected to the member B" includes a state in which the member A is indirectly connected to the member B via another member that does not affect the electric connection therebetween, in addition to a state in which the member A is physically and directly connected to the member B.

Similarly, the state represented by the phrase "the member C is provided between the member A and the member B" includes a state in which the member A is indirectly connected to the member C, or the member B is indirectly connected to the member C via another member that does not affect the electric connection therebetween, in addition to a state in which the member A is directly connected to the member C, or the member B is directly connected to the member C.

FIG. 1 is a circuit diagram which shows a configuration of an electronic device 200 including a power management circuit 100 according to an embodiment. For example, the electronic device 200 is a battery-driven information terminal device such as a cellular phone terminal, a PDA, a laptop PC, or the like. The electronic device 200 includes a battery 110, an adapter input terminal 114, and a load (system), in addition to the power management circuit 100.

The battery 110 is a secondary battery such as a lithium-ion battery, a nickel hydride battery, or the like, which outputs the battery voltage VBAT.

The adapter input terminal 114 is a terminal via which an external power supply 210 can be detachably mounted, and which receives the voltage (which will be referred to as the "external voltage" hereafter) VIN from the external power supply 210. The external power supply 210 is configured as an AC adapter 210a or a USB power supply 210b.

The power management circuit 100 receives the external voltage VIN and the battery voltage VBAT, selects one of these two voltages, and supplies the voltage thus selected to the load (which will be referred to as the "system" hereafter). In addition, the power management circuit 100 charges the battery 110 using the external voltage VIN. Examples of the system include an unshown power supply circuit, DSP, liquid crystal panel, and other analog circuits and digital circuits.

The power management circuit 100 is integrated as a function IC on a semiconductor substrate. The power management circuit 100 receives the external voltage VIN via an adapter input terminal PVIN. An input capacitor C10 is connected to the adapter input terminal PVIN, which stabilizes the external voltage VIN.

Furthermore, the battery 110 is connected to a path input terminal BAT1, via which the battery voltage VBAT is input. A system power supply terminal SYS is connected to a system which is the voltage supply destination.

The power management circuit 100 has a configuration including an intelligent path circuit and a charging circuit. Description will be made below regarding each of these components in turn.

1. Intelligent Path Circuit

The intelligent path circuit selects either the battery voltage VBAT supplied via the path input terminal BAT1 or the external voltage VIN supplied via the adapter input terminal PVIN based upon the magnitude relation between the battery voltage VBAT and the external voltage VIN, and supplies the voltage thus selected to the system connected to the system power supply terminal SYS.

The intelligent path circuit includes a first switch SW1 and second switches SW2 and SW2e. The first switch SW1 and the internal second switch SW2 are integrated in the power management circuit 100. The external second switch SW2e is configured as a discrete element external to the power management circuit 100.

The first switch SW1 is provided between the adapter input terminal PVIN and the system power supply terminal SYS. The ON/OFF operations of the first switch SW1 are controlled according to a control signal S1. The internal second switch SW2 is provided between the path input terminal BAT1 and the system power supply terminal SYS. The external second switch SW2e is provided as an external component of the power management circuit 100, which is connected in parallel with the internal second switch SW2. The external second switch SW2e is configured as a P-channel MOSFET, the gate of which is connected to an external PMOS gate control output terminal GATE. The ON/OFF operations of the pair of the internal second switch SW2 and the external second switch SW2e are controlled in a synchronous manner according to a control signal S2. The internal second switch SW2 and the external second switch SW2e will be collectively referred to simply as the "second switch SW2" hereafter. A driver 2 generates a gate voltage for the external second switch SW2e according to the control signal S2.

A logic circuit 14 generates the control signals S1 and S2 so as to control the first switch SW1 and the second switches SW2.

When the first switch SW1 is switched on and the second switches are switched off, the external voltage VIN received via the adapter input terminal PVIN is output to the system power supply terminal SYS. Conversely, when the second switches SW2 are switched on and the first switch SW1 is switched off, the battery voltage VBAT is output to the system power supply terminal SYS.

Figure 2:
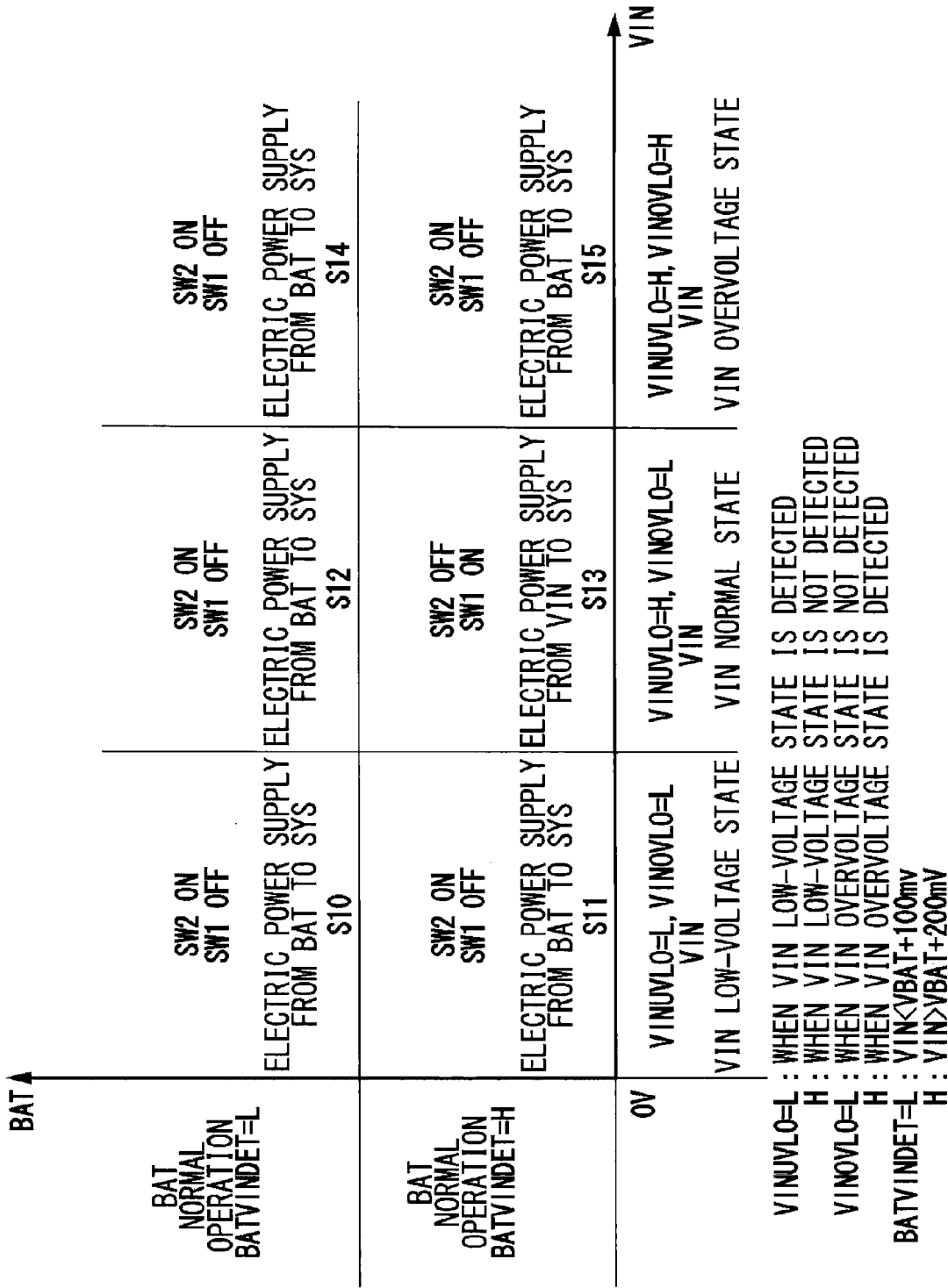
FIG. 2 is a diagram which shows the states of a first switch and a second switch.

FIG. 2 is a diagram which shows the states of the first switch SW1 and the second switches SW2.

When the input voltage VIN supplied from the adapter is in a low voltage state, the second switches SW2 are switched on and the first switch SW1 is switched off, thereby supplying electric power from the battery 110 to the system (S10, S11). The low voltage state is detected by an input voltage detection comparator 12 described later.

When the input voltage VIN supplied from the adapter (external power supply 210) is in the normal operation state, comparison is made between the battery voltage VBAT and the input voltage VIN. When judgment is made based upon the comparison result that the input voltage VIN is lower than the battery voltage VBAT (VIN<VBAT+100 mV, for example), the second switches SW2 are switched on and the first switch SW1 is switched off, thereby supplying electric power from the battery 110 to the system (S12).

When judgment is made based upon the comparison result that the input voltage VIN is higher than the battery voltage VBAT (VIN>VBAT+200 mV, for example), the second switches SW2 are switched off and the first switch SW1 is switched on, thereby supplying electric power from the external power supply 210 to the system (S13). An unshown comparator makes a comparison between the input voltage VIN and the battery voltage VBAT.

When the input voltage VIN supplied from the adapter is in an overvoltage state, the second switches SW2 are switched on and the first switch SW1 is switched off, thereby supplying electric power from the battery 110 to the system (S14, S15). The overvoltage state is detected by the input voltage detection comparator 12 described later.

As described above, the logic circuit 14 switches the states of the first switch SW1 and the second switches SW2 based upon the magnitude relation between the input voltage VIN and the battery voltage VBAT.

2. Charging Circuit

The charging circuit is a circuit configured to charge the battery 110 using the external voltage VIN. The charging circuit has a configuration including a synchronous rectification step-down DC/DC converter (switching regulator). The DC/DC converter includes a first transistor M1, a second transistor M2, an output inductor L2, and an output capacitor C2.

The first transistor M1 and the second transistor M2 are connected in series between the adapter input terminal PVIN and a fixed voltage terminal (ground terminal). The first transistor M1 is configured as a P-channel MOSFET, and is referred to as the "switching transistor". The second transistor M2 is configured as an N-channel MOSFET, and is referred to as the "synchronous rectification transistor".

The connection node that connects the first transistor M1 and the second transistor M2 is connected to a switch driver output terminal SW. One terminal of the output inductor L2 is connected to the terminal SW. The output capacitor C2 is provided between the other terminal of the output inductor L2 and the fixed voltage terminal (ground terminal). Furthermore, the other terminal of the output inductor L2 is connected to the battery 110 via a detection resistor RSNS.

The logic circuit 14 controls the ON/OFF operations of the first transistor M1 and the second transistor M2. The first transistor M1 and the second transistor M2 are switched in a complementary manner, and the charging current is thus applied to the battery 110 via the output inductor L2, thereby charging the battery 110.

The logic circuit 14 includes a state machine, and controls the charging state according to the states of the power management circuit 100 and the battery 110.

The state machine switches the state based upon the information received from an input current detection unit 10, the input voltage detection comparator 12, a thermal shutdown circuit 16, a charging current detection circuit 20, a fully charged state detection circuit 22, a battery voltage detection circuit 24, a temperature detection circuit 28, and a battery cell detection circuit 30.

The input current detection unit 10 detects the input current that flows through the output inductor L2 from the adapter input terminal PVIN via the first transistor M1. The input current flows intermittently in a pulsewise manner. The input current is converted into a voltage, following which the voltage thus converted is smoothed by means of a smoothing capacitor C1 connected to a capacitor connection terminal C1.

Figure 3:
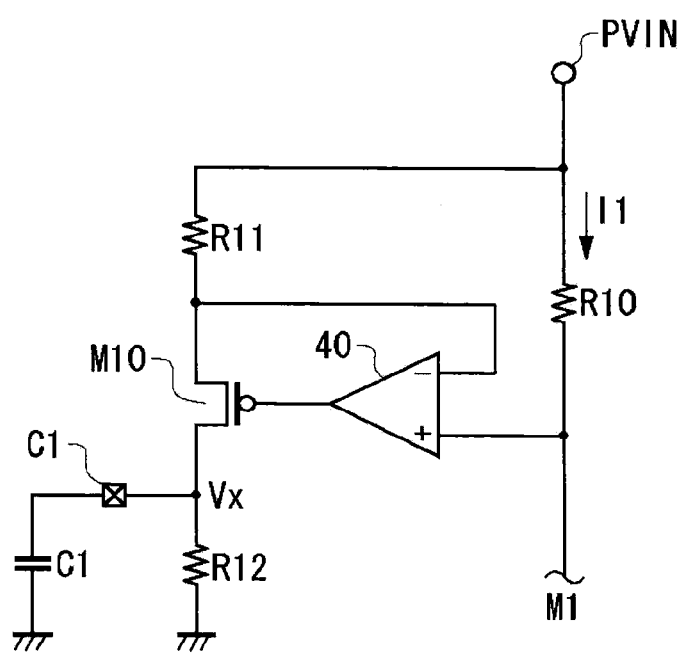
FIG. 3 is a circuit diagram which shows an example configuration of an input current detection unit.

FIG. 3 is a circuit diagram which shows an example configuration of an input current detection unit 10. The input current detection unit 10 includes resistors R10, R11, R12, an operational amplifier 40, and a smoothing capacitor C1. The resistor R10 is provided on the path of the current I1 to be detected. One terminal of the operational amplifier 40 is connected to one terminal of the resistor R10. The resistor R10, the transistor M10, and the resistor R12 are provided in series between the adapter input terminal PVIN and the ground terminal. The electric potential at a connection node that connects the transistor M10 and the resistor R12 is fed back to the other input terminal of the operational amplifier 40. The output voltage of the operational amplifier 40 is applied to the gate of the transistor M10. The voltage Vx, which is proportional to the voltage drop that occurs at the resistor R10, occurs at the resistor R12. The voltage Vx that occurs at the resistor R12 is smoothed by the smoothing capacitor C1 and thus becomes DC voltage. The voltage Vx is compared with a predetermined threshold voltage; in other words, the input current is compared with a threshold value. The comparison result is input to the logic circuit 14.

Returning to FIG. 1, a resistor R20 and a capacitor C20 are provided in series between the adapter input terminal 114 and the ground terminal. The electric potential at a connection node that connects the resistor R20 and the capacitor C20 is input to an input voltage detection terminal VINSNS. The input voltage detection comparator 12 compares the electric potential at the terminal VINSNS with a predetermined threshold voltage. The comparison result is output to the logic circuit 14.

The thermal shutdown circuit 16 compares the temperature of the power management circuit 100 with a predetermined threshold value, and outputs the comparison result to the logic circuit 14.

An oscillator 18 generates a cyclic signal necessary for the the first transistor M1 and the second transistor M2 to be switched at a predetermined frequency.

The charging current detection circuit 20 detects the charging current that flows into the battery 110. The detection resistor RSNS is provided on the path through which the charging current flows. Accordingly, a voltage drop which is proportional to the charging current occurs at the detection resistor RSNS. One terminal of the detection resistor RSNS is connected to the plus terminal IS1 of the charging current sensing input terminal, and the other terminal thereof is connected to the minus terminal IS2 of the charging current sensing input terminal. The charging current detection circuit 20 receives the electric potentials applied to these two terminals IS1 and IS2, and generates the detection voltage, which is proportional to the charging current. The logic circuit 14 checks the detection voltage, and performs a feedback control operation on the duty ratio between the ON time and the OFF time set for the first transistor M1 and the second transistor M2 (constant current charging operation) such that the charging current approaches a predetermined target value.

Figure 4:
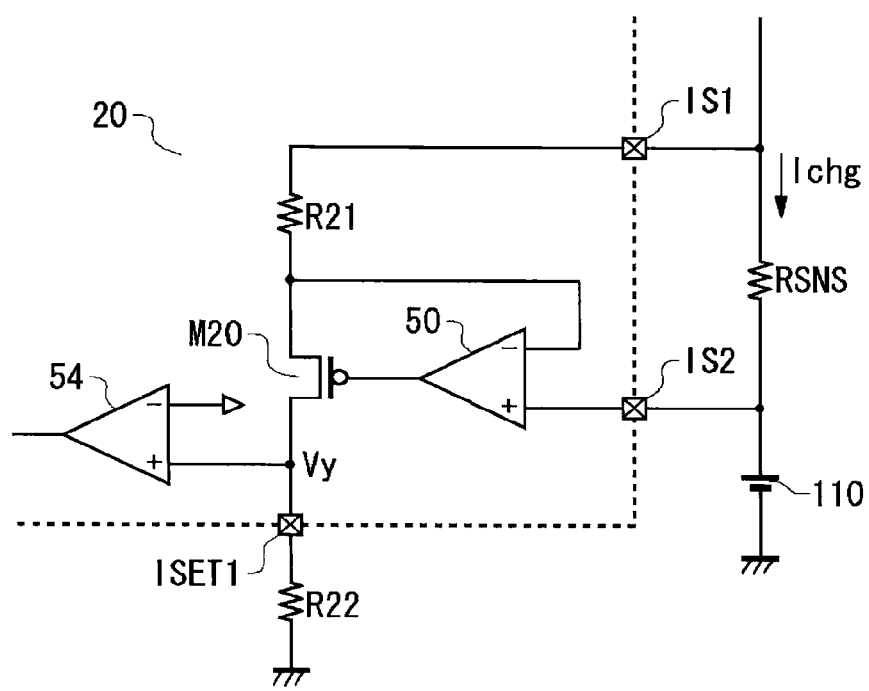
FIG. 4 is a circuit diagram which shows a configuration of a charging current detection circuit.

FIG. 4 is a circuit diagram which shows a configuration of a charging current detection circuit 20. The charging current detection circuit 20 includes resistors R21 and R22, a transistor M20, an operational amplifier 50, and a comparator 54. The resistor 21, the transistor M20, and the resistor R22 are connected in series between the terminal IS1 and the ground terminal. The non-inverting input terminal of the operational amplifier 50 is connected to the terminal IS2. The gate of the transistor M20 is connected to the output terminal of the operational amplifier 50. A connection node that connects the resistor R21 and the transistor M20 is connected to the inverting input terminal of the operational amplifier 50. The resistor R22 is configured such that it can be connected as an external component via a terminal ISET1.

The electric potential Vy at the terminal ISET1 is represented by the Expression Ichg×RSNS×R22/R21. The comparator 54 compares the electric potential Vy with a predetermined threshold voltage Vth. That is to say, the comparator 54 makes a comparison so as to obtain the magnitude relation between the charging current Ichg and a termination current Iterm which corresponds to the threshold voltage Vth. The termination current Iterm is represented by the Expression Iterm=Vth/RSNS×R21/R22. Thus, such an arrangement allows the designer of such a set to adjust the termination current Iterm by adjusting the resistor R22 connected to the terminal ISET1.

A terminal ISET2 is connected to a resistor for adjusting the rapid charging current that flows in the rapid charging operation.

A battery voltage detection input terminal BAT2 is connected to the battery 110, which applies the battery voltage VBAT to the battery voltage detection input terminal BAT2. Resistors R30 and R31 are connected in series between the battery voltage detection input terminal BAT2 and the ground terminal, which divides the battery voltage VBAT. The fully charged state detection circuit 22 compares the battery voltage VBAT thus divided with a predetermined fully charged state detection threshold value. The comparison result is output to the logic circuit 14.

The battery voltage detection circuit 24 compares the battery voltage VBAT supplied via the battery voltage detection input terminal BAT2 with a predetermined reference voltage. The logic circuit 14 performs a feedback control operation on the duty ratio between the ON time and the OFF time set for the first transistor M1 and the second transistor M2 such that the battery voltage VBAT approaches the reference voltage (constant voltage charging operation).

Figure 5B:
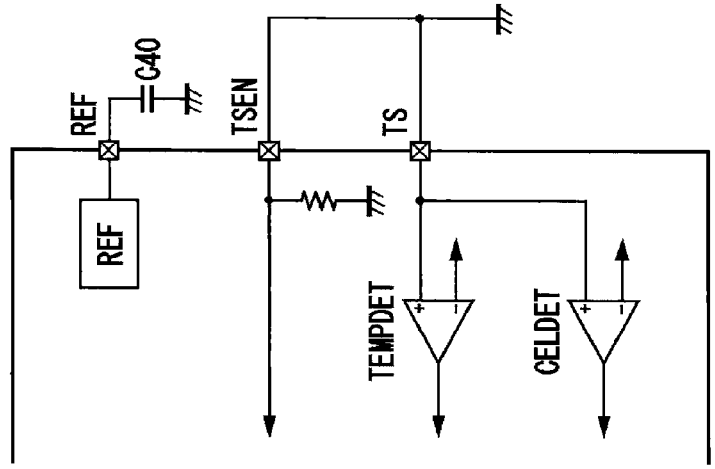
FIGS. 5A and 5B are diagrams which show a peripheral circuit which relates to temperature detection and battery detection.
Figure 5A:
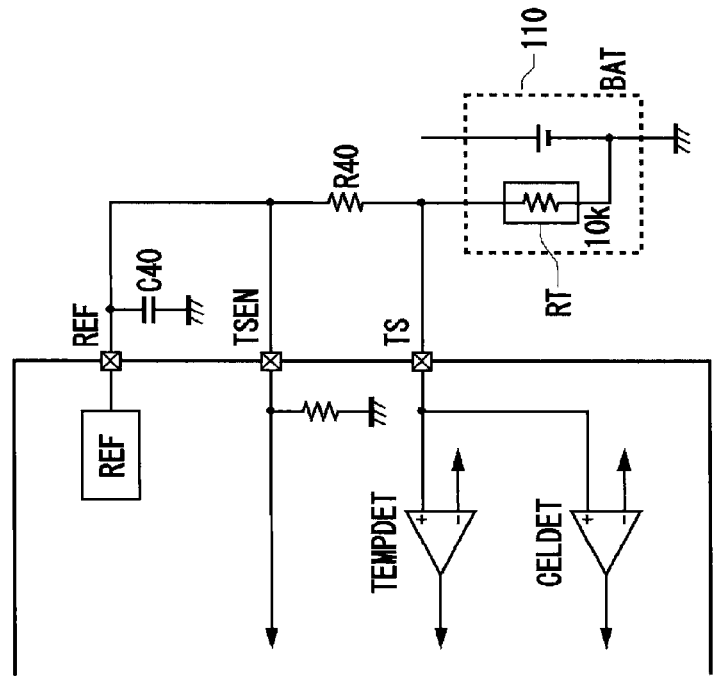

FIGS. 5A and 5B are diagrams which show a peripheral circuit that relates to the temperature detection and the battery detection. FIG. 5A shows a connection arrangement in which the temperature is detected using a thermistor RT provided to the battery 110. A reference voltage source 26 generates a reference voltage VREF. The reference voltage VREF thus generated is output via a reference voltage terminal REF. A capacitor C40 is connected between the reference voltage terminal REF and the ground terminal, which stabilizes the reference voltage VREF. The battery 110 includes the thermistor RT. A resistor R40 is connected in series with the thermistor RT between the reference voltage terminal REF and the ground terminal. The electric potential at a connection node that connects the resistor R40 and the thermistor RT is a voltage which depends on the temperature of the battery 110, and is input to a temperature detection terminal TS.

The temperature detection circuit 28 compares the electric potential at the temperature detection terminal TS with a predetermined threshold voltage, thereby comparing the temperature of the battery 110 with a threshold value. The comparison result is output to the logic circuit 14. It should be noted that, in FIG. 5A, a temperature detection enable terminal TSEN is pulled up to the reference voltage VREF.

When the battery 110 is not mounted, the reference voltage VREF is input to the temperature detection terminal TS, and when the battery 110 is mounted, the voltage obtained by dividing the reference voltage VREF by means of the resistor R40 and the thermistor RT is input to the temperature detection terminal TS. With such an arrangement, the battery cell detection circuit 30 compares the electric potential at the temperature detection terminal TS with a predetermined threshold voltage, thereby judging whether or not the battery 110 has been mounted. The logic circuit 14 is notified of the judgment result.

FIG. 5B shows a connection arrangement in which the thermistor RT is not used. In this case, the temperature detection terminal TS is grounded, which disables the temperature detection circuit 28 and the battery cell detection circuit 30. In a case in which the set designer desires to use his/her own method for detecting the temperature of the battery 110 and for detecting whether or not the battery 110 has been mounted, the circuit is set as shown in FIG. 5B. It should be noted that, in FIG. 5B, the temperature detection enable terminal TSEN is pulled down to the ground electric potential.

The electric potential at the temperature detection enable terminal TSEN is input to the logic circuit 14. The logic circuit 14 judges whether the circuit is configured in the state shown in FIG. 5A or the state shown in FIG. 5B based upon the state of the terminal TSEN. It should be noted that the logic circuit 14 prohibits the state machine described later from switching to the temperature error stop state S112 according to the electric potential at the temperature detection enable terminal TSEN.

Returning to FIG. 1, the power management circuit 100 is set to one of a suspend mode, ⅕ mode, normal mode, and double mode. The power management circuit 100 includes mode selection input terminals SET0 and SET1 used to set the mode. The input terminals SET0 and SET1 each receive either the high level (1) or the low level (0) as an input signal.

The operation mode of the power management circuit 100 is set according to the combination of the two values input to the input terminals SET0 and SET1. FIG. 6 shows the relation between the combination of the values input to the input terminals SET0 and SET1 and the operation mode.

When the suspend mode is selected, the charging operation for the battery 110 is stopped.

When the normal mode is selected, the input current limit (upper limit) to be detected by the input current detection unit 10 is set to a predetermined value (500 mA). When the ⅕ mode is selected, the input current limit is set to 100 mA, which is ⅕ the limit set for the normal mode. When the double mode is selected, the input current limit is set to 1 A, which is double the limit set for the normal mode. When the suspend mode is selected, a suspend signal is set to 1.

Returning to FIG. 1, the ground terminal PGND and the ground terminal GNDREF are grounded. Test terminals TEST1 through TEST4 are provided, which allow the operation of the power management circuit 100 to be monitored.

The charging circuit switches between a suspend state S100, a pre-charging state S102, a rapid charging state S104, a termination current detection state S106, a charging operation completion state S108, a battery error stop state S110, and a temperature error stop state S112. The operation for switching between these states is managed by a state machine included in the logic circuit 14.

S100 Suspend State (SUSPEND)

The suspend state is a state in which input voltage error (overvoltage lockout state, low voltage lockout state) or temperature error has occurred. In the suspend state, the charging operation is stopped.

S102 Pre-Charging State (PRE_CHG)

The pre-charging state is a state in which the pre-charging operation is to be performed when the battery voltage is low (VBAT<2.85 V).

S104 Rapid Charging State (TURBO_CHG)

The charging operation is performed using the charging current Ichg as a feedback signal such that the charging current Ichg is maintained at a constant value (constant current charging operation). Subsequently, when the battery voltage VBAT is close to the fully charged state, the charging operation is performed (constant voltage charging operation) using the battery voltage VBAT as a feedback signal such that the battery voltage VBAT matches a predetermined reference voltage (fully charged state voltage VFULL).

S106 Termination Current Detection State (Iterm_detect)

The termination current detection state is a state in which the charging current Ichg is lower than the terminal current Iterm, and the battery is fully charged (VBAT≧VFULL). The termination current detection state is maintained for a predetermined period of time, following which the charging circuit is switched to a different next state.

S108 Charging Operation Completion State (CHG_complete)

The charging operation completion state is a state in which the battery voltage VBAT reaches the fully charged state voltage VFULL.

S110 Battery Error Stop State

The battery error stop state is selected when the battery is in the abnormal state.

S112 Temperature Error Stop State (TEMP_STOP)

The temperature error stop state is a state in which there is an abnormal temperature. The temperature error stop state S112 is valid only in a case in which the temperature is detected by means of the thermistor RT shown in FIG. 5A.

Figure 7:
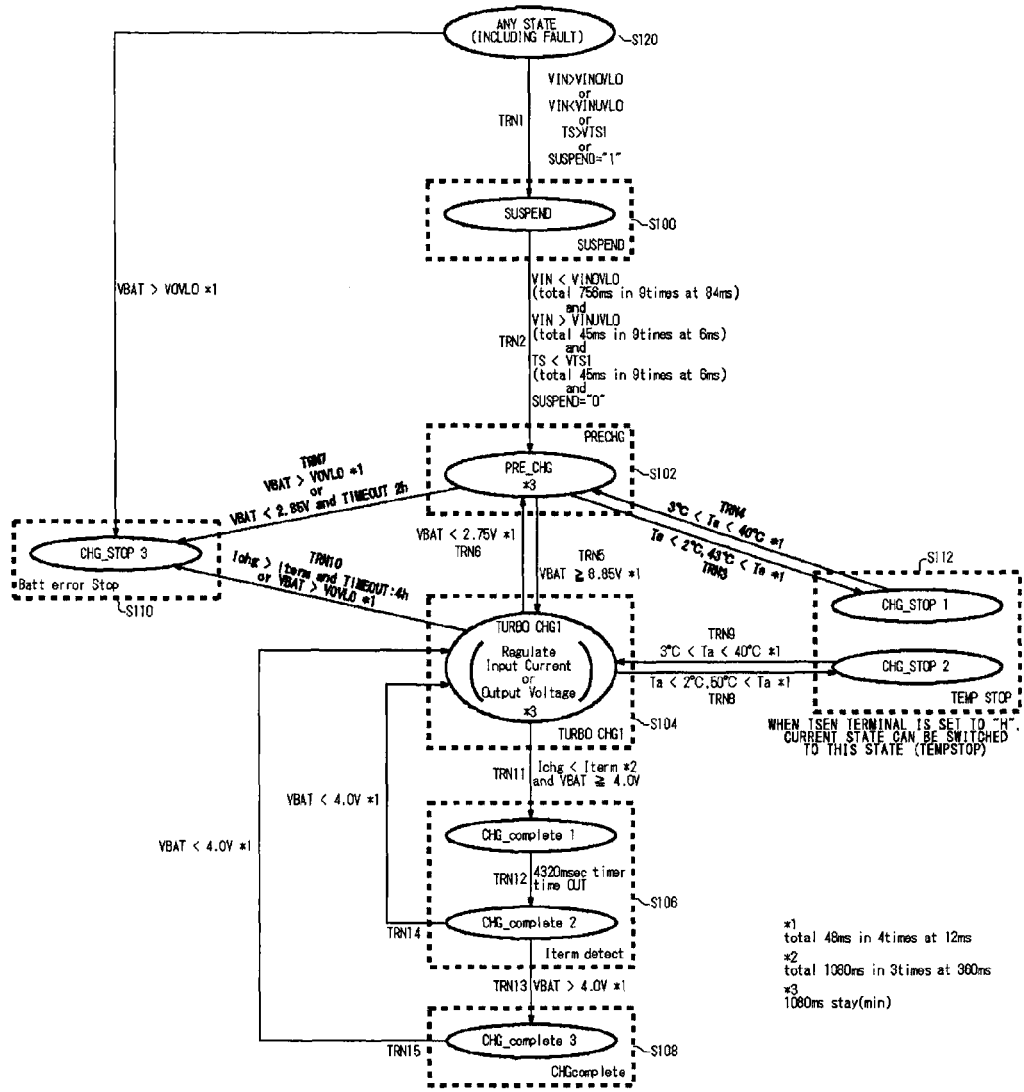
FIG. 7 is a state transition diagram for a charging circuit.

FIG. 7 is a state transition diagram of the charging circuit. In a given state S120, when the input voltage VIN is higher than a threshold voltage VINOVLO (overvoltage lockout state), when the input voltage VIN is lower than a threshold voltage VINULVO (low voltage lockout state), when the electric potential at the temperature detection terminal TS is higher than a threshold voltage VTS1 (high temperature state), or when the suspend signal is set to 1, the state machine switches to the suspend state S100 (TRN1).

In the suspend state S100, when the input voltage VIN is within the normal voltage range (VINUVLO<VIN<VINOVLO), the temperature is within the normal range, and the suspend signal is maintained at "0" for a predetermined period of time, the state machine switches to the pre-charging state (TRN2).

In the pre-charging state S102, when judgment is made that the ambient temperature Ta has deviated from a predetermined range (e.g., is equal to or lower than 2° C., or is equal to or higher than 50° C.), based upon the result of temperature detection using the thermistor RT, the state machine switches to a first stop state (CHG_STOP1) in the temperature error stop state S112 (TRN3).

In the first stop state (CHG_STOP1) in the temperature error stop state S112, when the ambient temperature Ta is within a predetermined range (e.g., between 3° C. and 40° C.), the state machine switches to the pre-charging state S102 (TRN4).

When the battery voltage VBAT becomes a predetermined voltage or more as a result of the pre-charging operation in the pre-charging state S102 (VBAT≧2.85 V), the state machine switches to the rapid charging state S104 (TRN5). Conversely, when the battery voltage VBAT drops below a predetermined voltage (VBAT<2.85 V), the state machine switches to the pre-charging state S102 (TRN6), which performs the pre-charging operation again.

In the pre-charging state S102, when the battery voltage VBAT is in the overvoltage state (VBAT>VOVLO), or when the battery voltage VBAT remains in the low voltage state (VBAT<2.85 V) for a predetermined period of time (e.g., two hours), the state machine switches to the battery error stop state S110 (TRN7).

In the rapid charging state S104, when judgment is made that the ambient temperature Ta has deviated from a predetermined range (e.g., is equal to or lower than 2° C., or is equal to or higher than 50° C.), based upon the result of temperature detection using the thermistor RT, the state machine switches to a second stop state (CHG_STOP2) in the temperature error stop state S112 (TRN8).

In the second stop state (CHG_STOP2) in the temperature error stop state S112, when the ambient temperature Ta is within a predetermined range (e.g., between 3° C. and 40° C.), the state machine switches to the rapid charging state S104 (TRN9).

In the rapid charging state S104, if the state in which the charging current Ichg is higher than the termination current Iterm continues for a predetermined period of time (e.g., four hours), or if the battery voltage enters the overvoltage lockout state (VBAT>VOVLO), the state machine switches to the battery error stop state S110 (TRN10).

In the rapid charging state S104, when the charging current Ichg is smaller than the termination current Iterm, and the battery voltage VBAT is equal to or greater than the fully charged state voltage VFULL (e.g., 4 V), the state machine switches to the first state (CHG_complete1) in the termination current detection state S106 (TRN11). After a predetermined period of time passes in this state (e.g., after 4320 ms), the state machine switches to the second state (CHG_complete2) (TRN12). In this stage, when the battery voltage VBAT is higher than the fully charged state voltage VFULL (VBAT>4.0 V), the state machine switches to the charging operation completion state S108 (TRN13), and when the battery voltage VBAT is lower than the fully charged state voltage VFULL (VBAT<4.0 V), the state machine switches to the rapid charging state S104 (TRN14).

In the charging operation completion state S108, when the battery voltage VBAT drops below the fully charged state voltage VFULL (VBAT<4.0 V), the state machine switches to the rapid charging state S104. It should be noted that, in all the states, if overvoltage lockout error (VBAT>VOLVO) occurs, the state machine switches to the battery error stop state S110.

Returning to FIG. 1, the power management circuit 100 outputs signals which indicate the current state of the state machine via state output terminals STAT0 through STAT2. FIG. 8 is a diagram which shows the state signals STAT0 through STAT2 for each state. By outputting the state signals STAT0 through STAT2 to an external circuit, such an arrangement allows the state of the power management circuit 100 to be monitored on the set side.

FIG. 9 is a diagram which shows the list of the input/output terminals of the power management circuit 100. FIG. 10 is a diagram which shows a layout of the electrodes as viewed from the back face of the power management circuit 100.

FIG. 11 is a diagram which shows the rated operating conditions for the power management circuit 100.

The above-described embodiment has been described for exemplary purposes only, and is by no means intended to be interpreted restrictively. Rather, it can be readily conceived by those skilled in this art that various modifications may be made by making various combinations of the aforementioned components or processes, which are also encompassed in the technical scope of the present invention.

Description has been made above regarding the present invention with reference to the embodiments using specific terms. However, description has been made in the embodiments regarding only the mechanisms and applications of the present invention. Various modifications and changes in the layout may be made without departing from the scope and spirit of the present invention defined by appended claims.

The invention claimed is:

1. A power management circuit comprising:
 a first terminal connected to an external power supply;
 a second terminal connected to a battery;
 a selection circuit configured to make a comparison between a voltage supplied from the external power supply via the first terminal and a battery voltage supplied from the battery via the second terminal, and to select one from among the voltage supplied from the external power supply and the battery voltage supplied from the battery;
 an output terminal configured to output the voltage thus selected by the selection circuit to an external load circuit; and
 a DC/DC converter charging circuit configured to charge the battery using the voltage supplied from the external power supply,
  wherein the DC/DC converter charging circuit is a switching regulator which comprises a first transistor provided between the first terminal and a fixed voltage terminal,
 and wherein the power management circuit further comprises an input current detection unit configured to detect a current that flows through the first transistor,
 and wherein the input current detection unit comprises:
  a first resistor one terminal of which is connected to the first terminal, and which is provided in series with the first transistor;

a second resistor, a second transistor, and a third resistor arranged in series between the first terminal and the fixed voltage terminal; and an operational amplifier arranged such that the electric potential at the other terminal of the first resistor is input to a non-inverting input terminal thereof, and such that the electric potential at a connection node that connects the second resistor and the second transistor is input to an inverting input terminal thereof, where the operational amplifier outputs a voltage drop that occurs at the third resistor as a signal which corresponds to the current that flows through the first transistor, and wherein the switching operation of the first transistor is controlled according to a signal output from the input current detection unit.

2. A power management circuit according to claim 1, wherein the selection circuit comprises:
a first switch arranged between the first terminal and the output terminal; and
a second switch arranged between the second terminal and the output terminal.

3. A power management circuit according to claim 2, further comprising an input voltage detection comparator configured to compare a detection voltage that corresponds to the voltage input to the first terminal from the external power supply with a predetermined first threshold voltage,
wherein, when the detection voltage is lower than the first threshold voltage, the first switch is switched off, and the second switch is switched on.

4. A power management circuit according to claim 3, wherein, when the voltage input to the first terminal is higher than the first threshold voltage, a comparison is made between the voltage at the first terminal and the voltage at the second terminal,
and wherein, when the voltage at the first terminal is lower than the voltage at the second terminal, the second switch is switched on and the first switch is switched off,
and wherein, when the voltage at the first terminal is higher than the voltage at the second terminal, the first switch is switched on and the second switch is switched off.

5. A power management circuit according to claim 2, further comprising an input voltage detection comparator configured to compare a detection voltage that corresponds to the voltage input to the first terminal from the external power supply with a predetermined second threshold voltage,
wherein, when the detection voltage is higher than the second threshold voltage, the first switch is switched off, and the second switch is switched on.

6. A power management circuit according to claim 1, wherein the DC/DC converter charging circuit is a switching regulator which comprises a first transistor provided between the first terminal and a fixed voltage terminal,
and wherein the power management circuit further comprises a battery voltage detection circuit configured to compare the voltage supplied from the battery with a predetermined reference voltage,
and wherein the switching operation of the first transistor is controlled such that the voltage supplied from the battery approaches the reference voltage.

7. A power management circuit comprising:
a first terminal connected to an external power supply;
a second terminal connected to a battery;
a selection circuit configured to make a comparison between a voltage supplied from the external power supply via the first terminal and a battery voltage supplied from the battery via the second terminal, and to select one from among the voltage supplied from the external power supply and the battery voltage supplied from the battery;
an output terminal configured to output the voltage thus selected by the selection circuit to an external load circuit; and
a DC/DC converter charging circuit configured to charge the battery using the voltage supplied from the external power supply,
wherein the DC/DC converter charging circuit is a switching regulator which comprises a first transistor provided between the first terminal and a fixed voltage terminal,
and wherein the power management circuit further comprises a charging current detection circuit configured to detect a charging current supplied to the battery from the charging circuit,
wherein the charging current detection circuit comprises:
a detection resistor arranged on a path for the charging current such that one terminal thereof is connected to the battery;
a first resistor, a second transistor, and a second resistor arranged in series between the other terminal of the detection resistor and the fixed voltage terminal; and
an operational amplifier arranged such that the electric potential at one terminal of the detection resistor is input to a non-inverting input terminal thereof, and such that the electric potential at a connection node that connects the first resistor and the second transistor is input to an inverting input terminal thereof, where the operational amplifier outputs a voltage drop that occurs at the second resistor as a signal that corresponds to the charging current,
and wherein the switching operation of the first transistor is controlled such that the signal output from the charging current detection circuit approaches a predetermined target value.

8. A power management circuit according to claim 7, wherein the selection circuit comprises:
a first switch arranged between the first terminal and the output terminal; and
a second switch arranged between the second terminal and the output terminal.

9. A power management circuit according to claim 7, wherein the DC/DC converter charging circuit is a switching regulator which comprises a first transistor provided between the first terminal and a fixed voltage terminal,
and wherein the power management circuit further comprises a battery voltage detection circuit configured to compare the voltage supplied from the battery with a predetermined reference voltage,
and wherein the switching operation of the first transistor is controlled such that the voltage supplied from the battery approaches the reference voltage.

* * * * *